(12) United States Patent
Yoo et al.

(10) Patent No.: US 10,443,658 B2
(45) Date of Patent: Oct. 15, 2019

(54) PROPELLER SHAFT WITH LOCKING DEVICE

(71) Applicant: Hyundai Motor Company, Seoul (KR)

(72) Inventors: Sung Su Yoo, Gyeonggi-do (KR); Won Jun Choi, Gyeongsangnam-do (KR); Jang Ho Kim, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 685 days.

(21) Appl. No.: 14/959,033

(22) Filed: Dec. 4, 2015

(65) Prior Publication Data

US 2017/0067503 A1  Mar. 9, 2017

(30) Foreign Application Priority Data

Sep. 8, 2015 (KR) .................. 10-2015-0127230

(51) Int. Cl.
| | |
|---|---|
| *F16D 1/116* | (2006.01) |
| *F16C 3/03* | (2006.01) |
| *F16D 3/06* | (2006.01) |
| *F16D 1/10* | (2006.01) |
| *B60K 17/22* | (2006.01) |

(52) U.S. Cl.
CPC .............. *F16D 1/116* (2013.01); *B60K 17/22* (2013.01); *F16C 3/03* (2013.01); *F16D 1/10* (2013.01); *F16D 3/06* (2013.01); *F16C 2226/80* (2013.01); *F16D 2001/103* (2013.01); *Y10T 403/7033* (2015.01)

(58) Field of Classification Search
CPC ........ B60K 17/22; B60K 17/24; B62D 1/195; F16B 7/0413; F16B 7/042; F16B 7/105; F16B 21/183; F16C 3/03; F16C 2226/74; F16C 2226/80; F16D 1/02; F16D 1/06; F16D 1/0829; F16D 1/0852; F16D 1/087; F16D 1/10; F16D 1/102; F16D 1/112; F16D 1/116
USPC .................. 464/162–169, 182, 901; 280/777; 403/297, 325, 327, 328, 359.1–359.6, 403/DIG. 4
See application file for complete search history.

(56) References Cited

U.S. PATENT DOCUMENTS

| | | | | |
|---|---|---|---|---|
| 4,508,468 | A | * | 4/1985 | Irwin ........................ F16D 1/02 403/109.3 |
| 5,287,869 | A | * | 2/1994 | Wu .......................... A45B 19/04 403/327 |
| 5,674,024 | A | * | 10/1997 | Daumal Castellon .. F16D 1/116 403/325 |
| 6,145,416 | A | * | 11/2000 | Bonniot ............... B25B 23/0014 403/74 |
| 6,186,697 | B1 | | 2/2001 | Masuda et al. |

(Continued)

FOREIGN PATENT DOCUMENTS

| | | |
|---|---|---|
| CN | 103174761 A | 6/2013 |
| CN | 103867555 A | 6/2014 |

(Continued)

*Primary Examiner* — Josh Skroupa
(74) *Attorney, Agent, or Firm* — Mintz Levin Cohn Ferris Glovsky and Popeo, P.C.; Peter F. Corless

(57) ABSTRACT

A propeller shaft with a locking device includes a locking device for selectively coupling an exterior hub and an interior hub thereof. The propeller shaft has a structure that enables sliding between the interior and exterior hubs including a spline portion while the locking device is released by the load during a collision.

7 Claims, 8 Drawing Sheets

(56) References Cited

U.S. PATENT DOCUMENTS

| | | | |
|---|---|---|---|
| 6,874,392 B1 * | 4/2005 | Wu | B25B 23/0021 |
| | | | 81/177.2 |
| 8,357,005 B2 * | 1/2013 | Hu | A45D 1/04 |
| | | | 439/353 |
| 8,388,457 B2 * | 3/2013 | Keller | F16D 3/223 |
| | | | 464/901 |
| 8,469,423 B1 * | 6/2013 | Crowley, Jr. | B25G 1/04 |
| | | | 403/109.3 |
| 2015/0119154 A1 | 4/2015 | Choi | |

FOREIGN PATENT DOCUMENTS

| | | | | |
|---|---|---|---|---|
| CN | 104455050 A | | 3/2015 | |
| DE | 102007038878 A1 | * | 2/2008 | ............. F16D 1/108 |
| FR | 1560109 A | * | 3/1969 | ............... F16D 1/06 |
| GB | 939554 A | * | 10/1963 | ............ F16B 7/0413 |
| JP | 11-303846 A | | 2/1999 | |
| JP | 2005-313766 A | | 11/2005 | |
| JP | 4111838 B2 | | 7/2008 | |
| JP | 4222838 B2 | | 2/2009 | |
| JP | 2015-160551 A | | 9/2015 | |
| KR | 10-0471314 B1 | | 3/2005 | |
| KR | 10-2010-0060378 A | | 6/2010 | |
| KR | 10-1382838 B1 | | 4/2014 | |
| KR | 10-1509952 B1 | | 4/2015 | |

\* cited by examiner

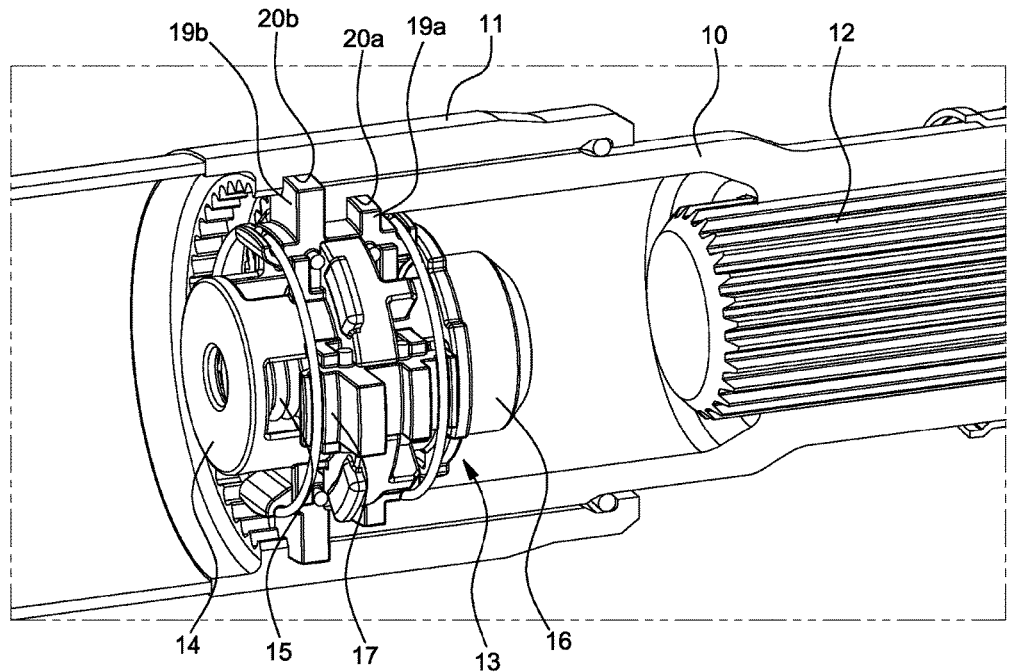
FIG. 4B
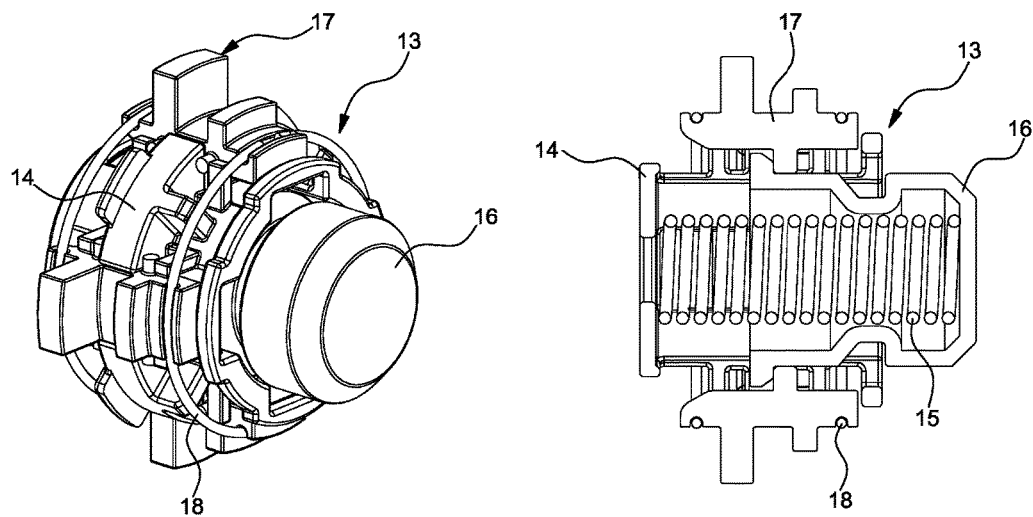
FIG. 5A  FIG. 5B

PROPELLER SHAFT WITH LOCKING DEVICE

CROSS-REFERENCE TO RELATED APPLICATION

This application claims under 35 U.S.C. § 119(a) the benefit of priority to Korean Patent Application No. 10-2015-0127230 filed on Sep. 8, 2015, the entire contents of which are incorporated herein by reference.

BACKGROUND (a) Technical Field

The present invention relates to a propeller shaft with a locking device and more particularly, to a propeller shaft with a locking device, capable of improving performance upon impact by reducing a collapse load generated during a collision.

(b) Background Art

Generally, propeller shafts are disposed between transfers and axles to transfer driving force. A propeller shaft includes tubes and joints, and has a spline structure to absorb variation in a length thereof. When the length of the propeller shaft is increased, the shaft is divided to secure a safety factor from the critical number of revolutions. In particular, the propeller shaft includes a center bearing structure that supports the divided portions.

FIG. 1 is an exemplary front view illustrating a swaging structure in a propeller shaft, and illustrates the swaging structure applied to a tube to reduce a collapse load during a collision. In other words, a powertrain is pushed during a collision, and thus a spline portion 100 primarily slides in an axial direction. In particular, when the end of a hub (not shown) comes into contact with a center bearing assembly (not shown) and the pushing of the powertrain is primarily completed, deformation is secondarily generated at a swaging portion 130 and the remaining pushing of the powertrain is absorbed. For example, reference numeral 140 refers to a tube, and reference numeral 170 refers to a rubber coupling.

The optimization of the swaging structure is performed through tests and analysis thereof to improve performance upon impact, and thus a collapse load is reduced by about 20% more than existing collapse loads. However, further improvements to performance upon impact are limited by the processing and strength of the swaging structure. For example, there is a need to apply a new structure in place of the current structure to the propeller shaft.

The above information disclosed in this section is merely for enhancement of understanding of the background of the invention and therefore it may contain information that does not form the prior art that is already known in this country to a person of ordinary skill in the art.

SUMMARY

The present invention provides a propeller shaft with a locking device

In one aspect, the propeller shaft with a locking device may include a locking device for selectively coupling an exterior hub and an interior hub. The propeller shaft may further include a structure that enables lateral translation (e.g., sliding or decoupling) between the interior and exterior hubs having a spline portion while the locking device may be released by the load during collision. Additionally, the performance upon impact may improve performance upon impact by minimizing a collapse load generated during the collision.

The propeller shaft having a locking device may include a locking device disposed in a portion where an interior hub overlaps with an exterior hub within the propeller shaft, and may be installed to be latched to both the hubs for locking the interior hub to the exterior hub. Further the locking device may operate by contact with a spline portion slidably coupled to the interior hub to unlatch the latching of the locking device to the exterior hub. The locking between the interior hub and the exterior hub may be unlocked, to enable both of the hubs to slide relative to each other.

The propeller shaft having a locking device may improve performance upon impact by reducing a collapse load generated in the event of collision. For example, when vehicle collision occurs, the locking of the locking device may be unlocked and the interior and exterior hubs may be simultaneously separated from each other while sliding relative to each other, (e.g., are decoupled from each other). Alternately, the interior hub may be inserted into the exterior hub while the overlap between the interior and exterior hubs may increase.

The locking device may include a hollow case, a switch coupled inside the case to axially movable while being elastically supported by a spring. The switch may contact the spline portion a plurality of stoppers may be disposed on a circumference of the case and contact and be supported by an exterior peripheral surface of the switch. Further, each of the stoppers may be latched to both interior peripheral surfaces of the interior and exterior hubs and may be able to translate radially, and ring springs may support the stoppers while surrounding circumferences thereof.

The stoppers of the locking device may include a plurality of latch protrusions disposed on an exterior surface of each stopper and may be respectively fitted into latch grooves disposed in the interior peripheral surfaces of the interior and exterior hubs. Accordingly, both of the hubs may be restricted from sliding relative to each other. The stoppers of the locking device may support protrusions disposed on interior peripheral surfaces thereof by the exterior peripheral surface of the switch. Additionally, the stoppers may be restricted from radial translation. The stoppers of the locking device may contact the spline portion and the switch to support protrusions of the stoppers received in a protrusion insertion groove disposed in the exterior peripheral surface of the switch by elastic force of the ring springs when the switch moves. Accordingly, the latching of the interior hub to the exterior hub may be in an unlatched position.

BRIEF DESCRIPTION OF THE DRAWINGS

The above and other features of the present invention will now be described in detail with reference to exemplary embodiments thereof illustrated the accompanying drawings which are given hereinbelow by way of illustration only, and thus are not limitative of the present invention, and wherein:

FIGS. 4A and 4B are exemplary front and perspective views illustrating the installation place and the installation state of the locking device according to the exemplary embodiment of the present invention;

FIGS. 5A-5D are exemplary perspective and cross-sectional views illustrating the state of operation of the locking device according to the exemplary embodiment of the present invention;

Figure 1A:
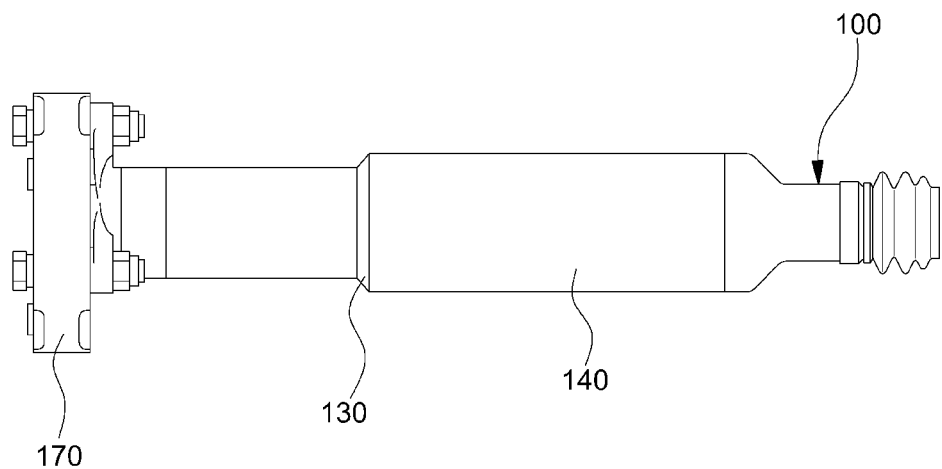
FIGS. 1A-1B are exemplary front views illustrating a swaging structure in a typical propeller shaft according to the related art.
Figure 1B:
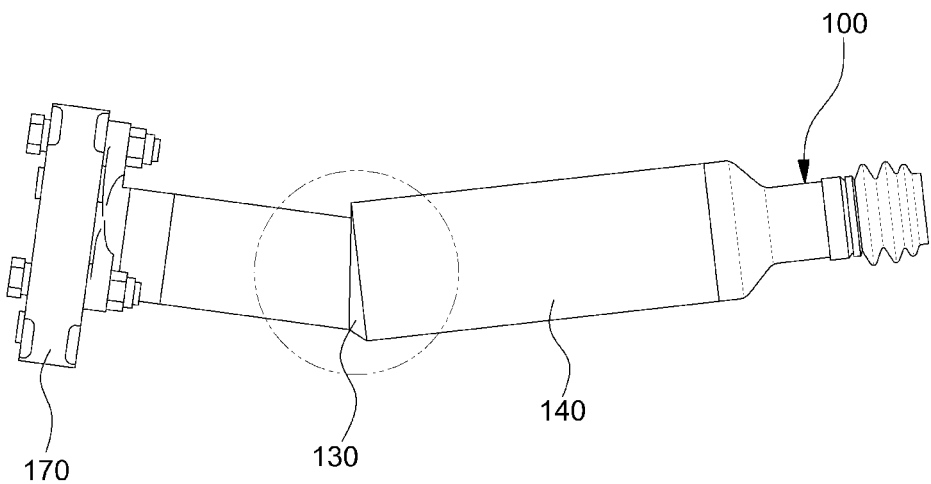

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment. In the figures, reference numbers refer to the same or equivalent parts of the present invention throughout the several figures of the drawing.

DETAILED DESCRIPTION

Hereinafter reference will now be made in detail to various exemplary embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, in order to make the description of the present invention clear, unrelated parts are not shown and, the thicknesses of layers and regions are exaggerated for clarity. Further, when it is stated that a layer is "on" another layer or substrate, the layer may be directly on another layer or substrate or a third layer may be disposed therebetween.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Figure 2A:
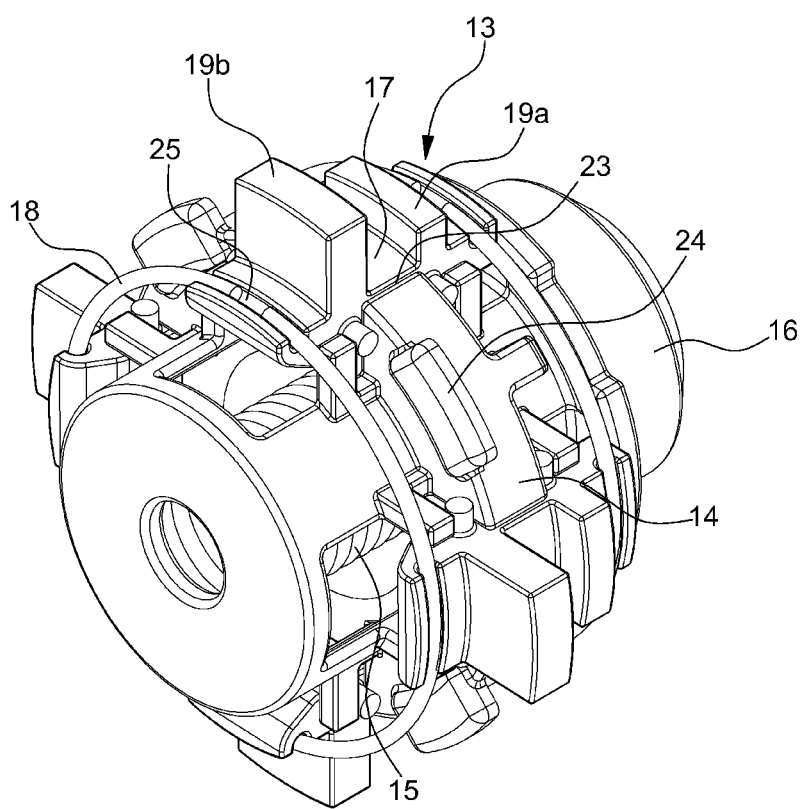
FIGS. 2A and 2B are exemplary perspective views illustrating a locking device according to an exemplary embodiment of the present invention.
Figure 2B:
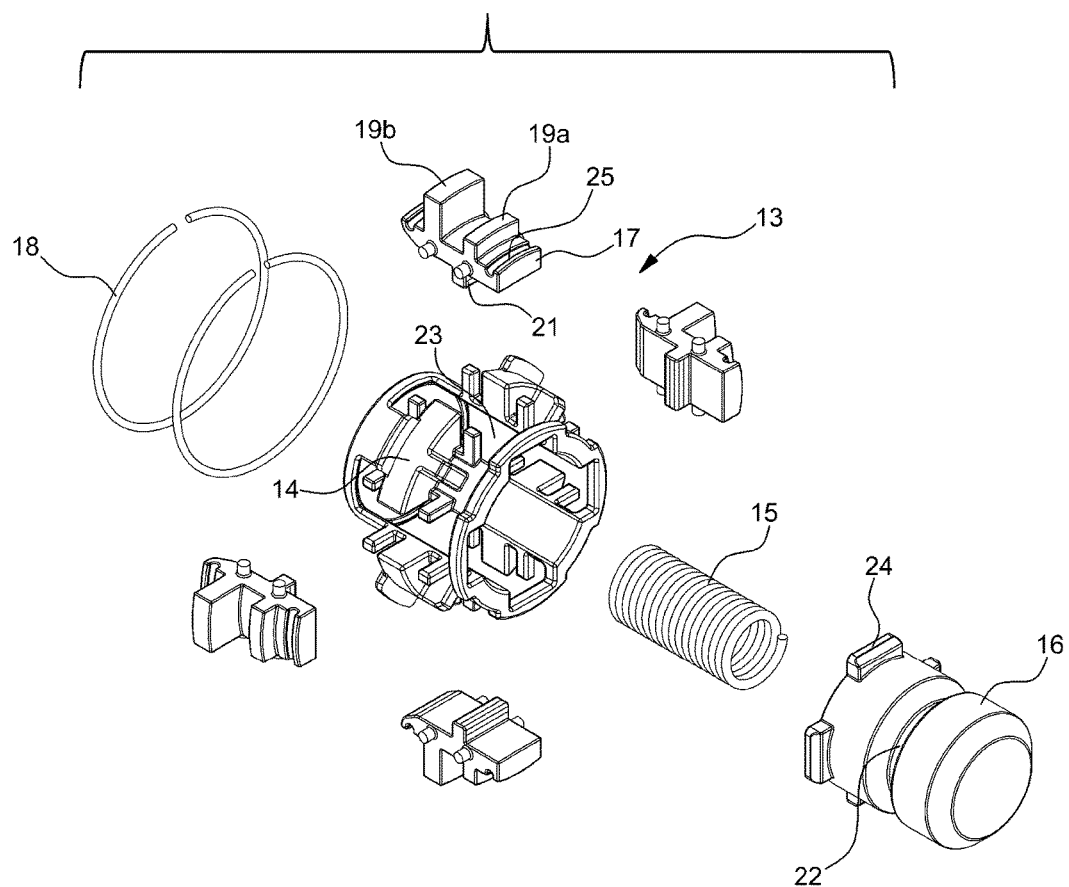
Figure 3:
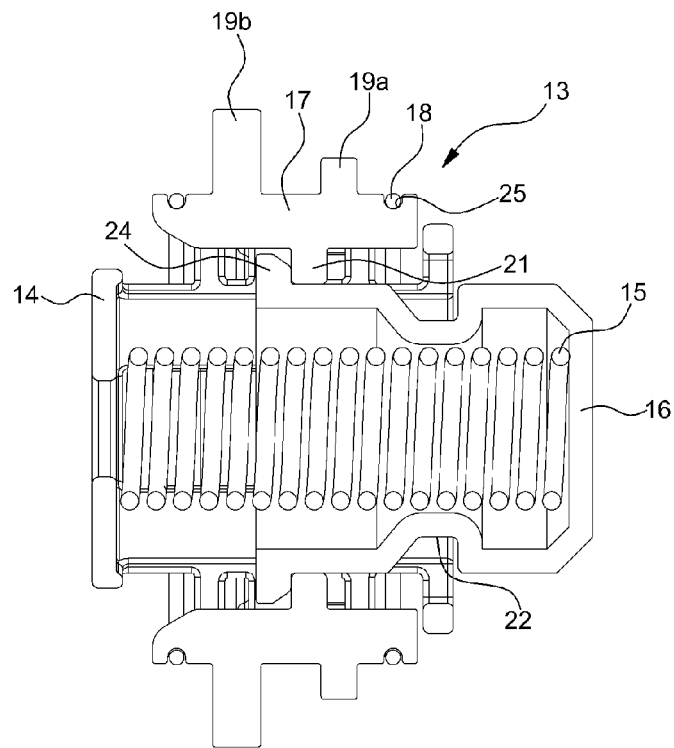
FIG. 3 is an exemplary cross-sectional view illustrating the locking device according to an exemplary embodiment of the present invention.

FIGS. 2A and 2B are exemplary perspective views illustrating a locking device according to an exemplary embodiment of the present invention. FIG. 3 is an exemplary cross-sectional view illustrating the locking device according to the exemplary embodiment of the present invention. As illustrated in FIGS. 2A, 2B, and 3, the locking device may lock an interior hub and an exterior hub. The locking device maintains the coupled position between the interior hub and the exterior hub, and may release the coupled position between the interior hub and the exterior hub during a collision.

For example, the locking device 13 may include a hollow case 14. The case 14 may have a hollow cylindrical shape that is axially penetrated and may include a plurality of stopper receiving portions 23 that may be disposed on the exterior circumferential surface thereof, for seating and receiving stoppers 17 to be described later. Each of the stopper receiving portions 23 may be radially penetrated. Additionally, the locking device 13 may include a switch 16 which may contact a spline portion.

The switch 16 having a cylindrical shape may be closed at the front portion and opened at the rear portion. The switch 16 may be concentrically installed in the case 14, and may translate axially. The switch 16 may be elastically supported by a spring 15 which may be disposed within the switch 16. Both ends of the spring 15 may be supported having one end supported by the interior wall of the switch and the other end supported by the rear wall of the case 14, thereby exhibiting a force pushing (e.g., actuating or translating) the switch 16 in a forward direction (e.g., toward the spline portion).

A plurality of protruding latches 24 may be disposed along the edge circumference of the switch 16 at the rear end portion. Each of the protruding latches 24 may engage with an associated support protrusion 21 of each stopper 17, and the switch 16 may be precluded from being separated from the case 14 in the forward direction. A protrusion insertion groove 22 may be circumferentially disposed at one side on the exterior peripheral surface of the switch 16, (e.g. on the intermediate portion of the length of the switch). The stoppers 17 may translate radially when the support protrusions 21 of the stoppers 17 are seated (e.g., positioned) within the protrusion insertion groove 22.

Additionally, the locking device 13 may include the stoppers 17 that substantially lock the interior hub and the exterior hub. Each of the stoppers 17 may have a rectangular plate shape of an arc cross-section. The stoppers 17 may have a plurality of (e.g., two) latch protrusions 19a and 19b which are disposed at the front and rear in the longitudinal direction on the exterior surface, and have a pre-determined height in the radial direction thereof.

Accordingly, the front latch protrusion 19a of the stopper 17 may be fitted and latched into a latch groove 20a disposed within the interior peripheral surface of the interior hub.

Additionally, the rear latch protrusion 19b of the stopper 17 may be fitted and latched into a latch groove 20b disposed within the interior peripheral surface of the exterior hub. Therefore, the interior and exterior hubs may be restricted from axial translation by the stoppers 17. In other words, the interior and exterior hubs may be restricted from axially sliding beyond the stoppers 17, and thus the coupled state between the interior and exterior hubs may be maintained. The support protrusion 21 that extends radially may be disposed on the interior peripheral surface of each stopper 17. Since the support protrusion 21 may be supported by the exterior peripheral surface of the switch, the support protrusion 21 may be restricted from radial translation.

Spring seating grooves 25 may be disposed at respective front and rear ends on the exterior peripheral surface of each stopper 17. Ring springs 18 to be described later may be respectively positioned at the spring seating grooves 25. A plurality of stoppers 17 may each be may each be disposed along the circumference of the case 14 and may be seated and received within the stopper receiving portions 23 in the case 14.

Further, the locking device 13 may include the ring springs 18 to elastically support the stoppers 17. Each of the ring springs 18 may have a shape cut off at one side thereof. The ring springs 18 may concentrically disposed on the case 14, and may be disposed to simultaneously surround the circumferences of the respective stoppers 17 disposed on the exterior circumference of the case 14. The ring spring 18 may include a plurality of ring springs, and catches each stopper 17 from the exterior thereof while being seated within the spring seating groove 25. Accordingly, each stopper 17 may be subjected to spring elastic force in an inward direction and may be prevented from being separated radially outwardly by the ring spring 18. For example, each stopper 17 may translate radially inward by the spring force exhibited by the ring spring 18. In other words, the ring spring 18 exhibits a spring force that applies a pressure on each stopper 17 in an inward direction.

Figure 4A:
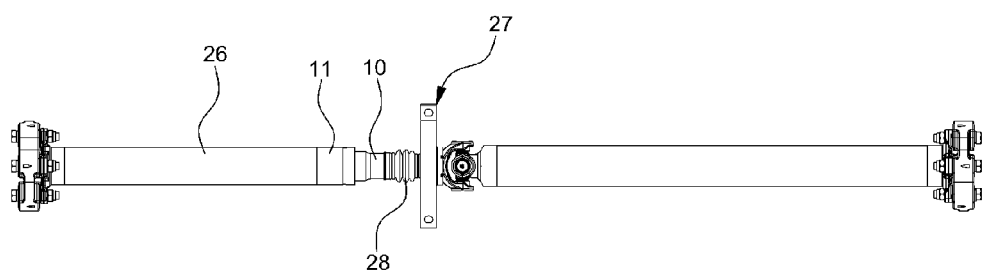
Figure 5C:
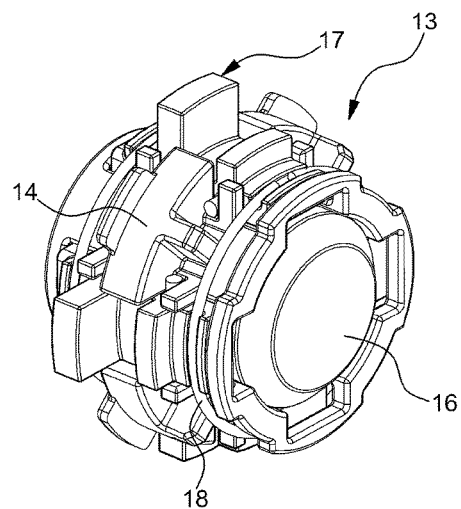
Figure 5D:
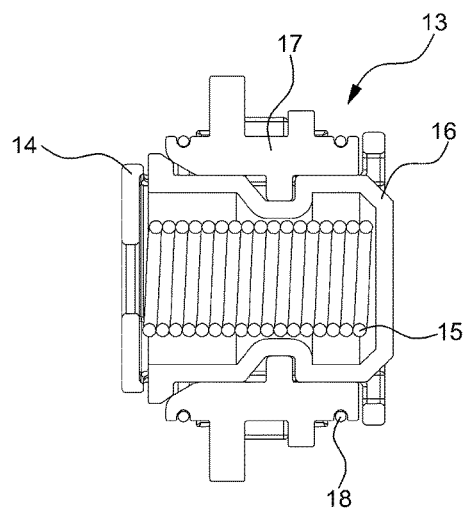
Figure 6A:
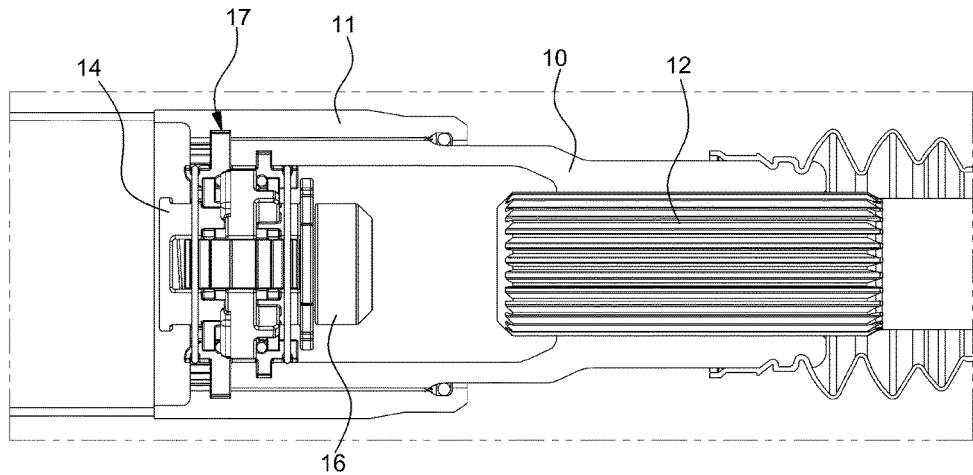
FIGS. 6A to 6D are exemplary cross-sectional views illustrating the connective operation relationship between an exterior hub, an interior hub, and the locking device in the event of collision according to the exemplary embodiment of the present invention.
Figure 6B:
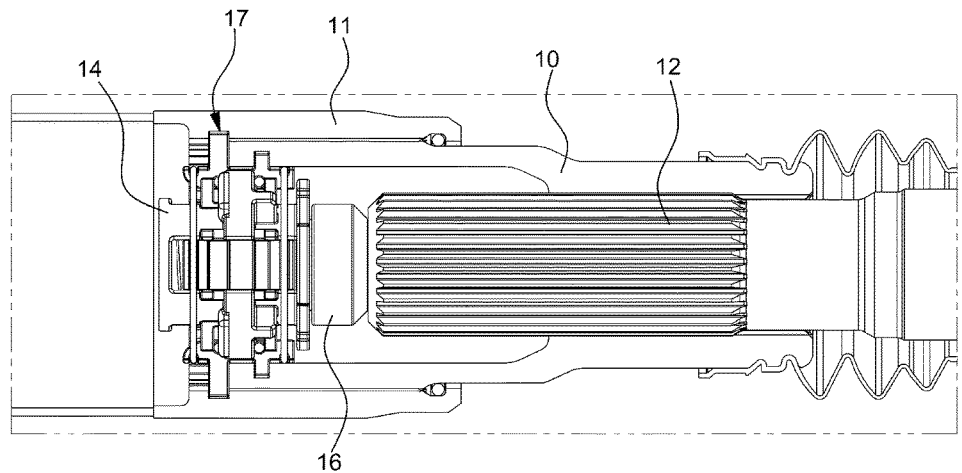
Figure 6C:
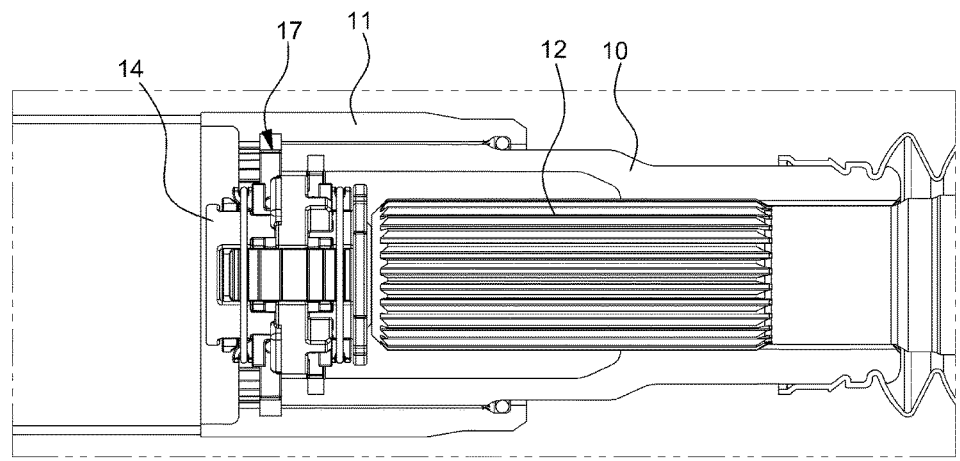
Figure 6D:
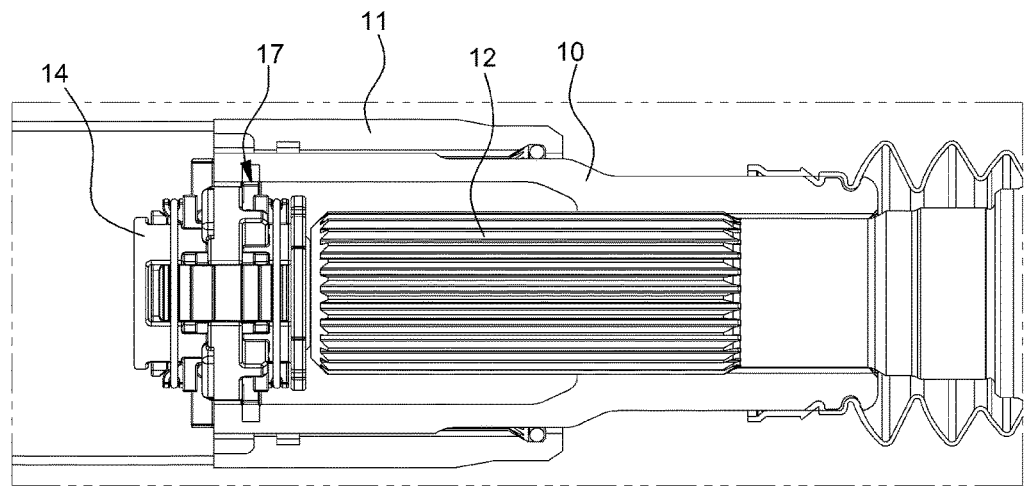

FIGS. 4A and 4B are exemplary front and perspective views illustrating the installation place and the installation state of the locking device according to the exemplary embodiment of the present invention. As illustrated in FIGS. 4A and 4B, the locking device 13 may be installed within a portion having an exterior hub 11 coupled to a tube 26 by welding overlaps with an interior hub 10 coupled to a boot 28 at a center bearing assembly 27 by a band. In other words, a portion of the interior hub 10 may be concentrically inserted into the exterior hub 11. The locking device 13 may be installed, having each stopper 17 of the the latch protrusions 19a and 19b fitted into the latch groove 20a of the interior hub 10 and the latch groove 20b of the exterior hub 11, and positioned at the boundary between the exterior hub 11 and the interior hub 10.

Particularly, the front of the switch 16 of the locking device 13 may be adjacent to the spline portion 12 slidably assembled within the interior hub 10. Accordingly, the exterior and interior hubs 11 and 10 may be restricted from axially sliding (e.g., lateral translation) by the locking action of the locking device 13. For example, the interior hub 10 may be first press-fitted into the exterior hub 11 that is the exterior spline of the interior hub 10 may be axially coupled to the interior spline of the exterior hub 11 in a press-fitting manner. In particular, the locking device 13 may be inserted through the exterior end of the exterior hub 11 to be fastened thereto (e.g., the locking device may be inserted when the switch is pressed by tools or the like pushed by the exterior end of the interior hub 10). When the tube 26 is bonded to the exterior hub 11 by friction welding, the coupling between the exterior and interior hubs 11 and 10 may include the locking device 13 therein, and the tube 26 may be formed.

FIGS. 5A-5D are exemplary perspective and cross-sectional views illustrating the operation of the locking device according to the exemplary embodiment of the present invention. As illustrated in FIGS. 5A-5D, the switch 16 protrudes outward from the case 14 by the elastic force of the spring 15, and the stoppers 17 protrude radially outwardly from the case 14 by the switch 16. Accordingly, the locked position between the interior hub and the exterior hub may be maintained. When the switch 16 axially translates rearward while being pressed by the spline portion during a vehicle collision, the support protrusions 21 latched to the exterior peripheral surface of the switch 16 may be received in the protrusion insertion groove 22 of the switch 16. Simultaneously, the stoppers 17 may be displaced radially by the elastic force of the ring springs 18 that exhibits the force for pressing the stoppers in the inward direction, and into the case 14. Thus, the latching between the locking device 13 and the hubs may be disposed in an unlatched position and the exterior and interior hubs 11 and 10 slide relative to each other. Consequently, the exterior and hubs 11 and 10 may be separated from each other. The overlap of the exterior and interior hubs 11 and 10 continues to increase, and the interior hub may be inserted into the exterior hub. and interior hubs 11 and 10 may be separated from each other. The overlap of the exterior and interior hubs 11 and 10 continues to increase, and the interior hub may be inserted into the exterior hub.

FIGS. 6A to 6D are exemplary cross-sectional views illustrating the connective operation relationship between the exterior hub, the interior hub, and the locking device during a collision. As illustrated in FIGS. 6A to 6D, when the vehicle normally travels (e.g., without error or failure), the basic functions, such as normal power transfer, of the exterior hub, the interior hub, and the locking device are performed similar to those of existing devices since the devices are coupled in a spline manner. In other words, a variation in axial length of the propeller shaft by the movement of a powertrain and a drive line unit generated when the vehicle normally travels is absorbed through the sliding between the interior spline portion 12 of the interior hub 10 and the exterior spline portion of a yoke shaft.

In particular, the locking device may be fixed in the locked state to prevent axial translation) between the interior spline of the exterior hub 11 and the exterior spline of the interior hub 10. When the locking device is disposed in the locked position, the stoppers 17 protrude outward from the case 14. The latch protrusions of the stoppers 17 may be inserted into the latch grooves disposed in the exterior and interior hubs 11 and 10 and the exterior and interior hubs 11 and 10 may be fixed to prevent move relative to each other. In other words, the splines of the exterior and interior hubs may be fixed to prevent movement by the locked position of the locking device when the vehicle travels normally. Further, the splines may slide during a collision (e.g. the splines may be pressed and assembled in order to reduce a backlash).

Moreover, when vehicle collision occurs, the powertrain may be displaced and the spline portion 12 between the yoke shaft and the interior hub 10 slides beyond a normal range. For example, the end of the yoke shaft, (e.g., the end of the spline portion 12) contacts the switch 16. Thus, the locked position of the locking device may be disengaged and unlocked. When the locked position of the locking device is unlocked, the fixed position between the exterior and interior hubs 11 and 1 may be released. In particular, the spline portion between the exterior and interior hubs 11 and 10 may slide due to a collision load, thereby being separated therefrom. The overlap of the exterior and interior hubs may continue to increase, the interior hub may be inserted into the exterior hub. Accordingly, the resistance due to a substantial collapse load of the conventional propeller shaft may not be generated during a collision. Therefore, the performance upon impact may be improved by reducing a collapse load and may improve the safety of passengers during a collision.

Figure 7:
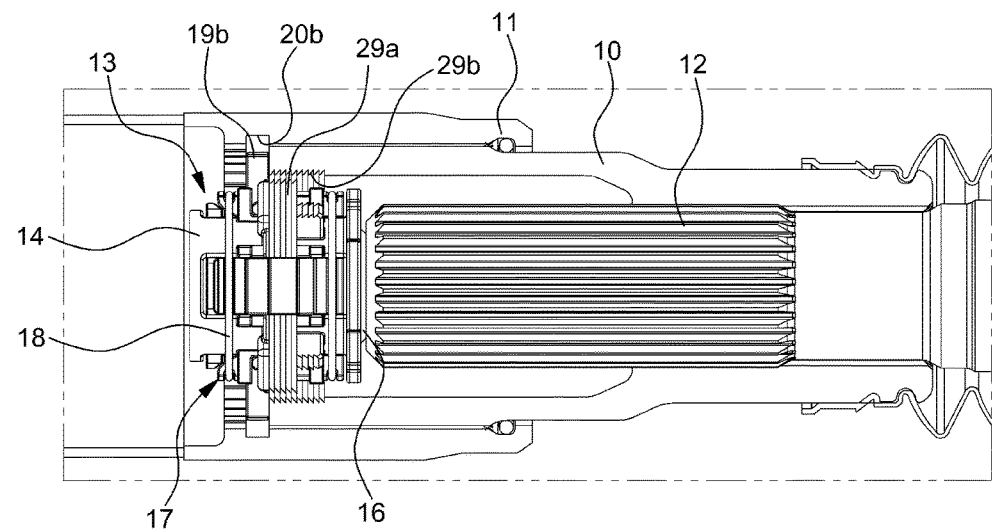
FIG. 7 is an exemplary cross-sectional view illustrating a locking device according to an exemplary embodiment of the present invention.

FIG. 7 is an exemplary cross-sectional view illustrating a locking device according to another exemplary embodiment of the present invention. As illustrated in FIG. 7, the exemplary embodiment illustrates an example having a locking device 13 integrally coupled to an interior hub 10 using a case fastening structure. In other words, a case 14 of the locking device 13 may have a hollow cylindrical shape that may be axially penetrated. The case 14 may include a plurality of stopper receiving portions 23 (see FIGS. 2A and 2B), are disposed on the exterior circumferential surface thereof, to seat and receive stoppers 17, and each of the stopper receiving portions 23 may be radially penetrated.

The case 14 may have a thread portion 29a is disposed on the exterior circumferential surface thereof, (e.g.,. on the exterior circumferential surface between the stopper receiving portions 23). The thread portion 29a may be fastened to a thread portion 29b disposed on the interior peripheral surface of the interior hub 10. Accordingly, when the thread portion 29a of the case 14 is fastened to the thread portion 29b of the interior hub 10, the locking device 13 may be integrally coupled to the interior side and front side of the interior hub 10.

Additionally, the locking device 13 may include a switch 16 which may contact a spline portion. Since the structure and operation of the switch 16 of the exemplary embodiment are the same as those of the switch of the above-mentioned embodiment, the detailed description thereof will be omitted. Further, the locking device 13 may include the stoppers 17 that lock the interior hub and the exterior hub. Each of the stoppers 17 may have a rectangular plate shape of an arc cross-section. The stoppers 17 may have one latch protrusion 19b disposed on the exterior surface thereof, and may have a pre-determined height in the radial direction thereof. Accordingly, the latch protrusion 19b, may be positioned at the rear of the stoppers 17, and may be fitted and latched into a latch groove 20a disposed within the interior peripheral surface of the exterior hub. Therefore, the interior and exterior hubs may be restricted from axial translation by the stoppers 17. In other words, the interior and exterior hubs may be restricted from axially sliding by the stoppers 17, and thus the coupled state between the interior and exterior hubs may be maintained.

A support protrusion 21 which may radially extend radially extends may be disposed on the interior peripheral surface of each stopper 17. Since the support protrusion 21 may be supported by the exterior peripheral surface of the switch, the support protrusion 21 may be restricted from radial translation. Spring seating grooves 25 may be disposed at respective front and rear ends on the exterior peripheral surface of each stopper 17. Ring springs 18 to be described later may be respectively positioned at the spring seating grooves 25. A plurality of stoppers 17 may each be disposed along the circumference of the case 14 and may be seated and received within the stopper receiving portions 23 in the case 14. Additionally, the locking device 13 may include the ring springs 18 to elastically support the stoppers 17. Since the ring springs 18 of the present embodiment are similar to those of the above-mentioned embodiment, the detailed description thereof will be omitted.

When the vehicle travels normally, the basic functions, such as normal power transfer, of the exterior hub, the interior hub, and the locking device are performed similar to those of existing devices since they are coupled in a spline manner. In other words, a variation in axial length of the propeller shaft by the movement of a powertrain and a drive line unit generated when the vehicle normally travels is absorbed through the sliding between the interior spline portion 12 of the interior hub 10 and the exterior spline portion of a yoke shaft In other words, the locking device is fixed in the locked position to prevent sliding (e.g., axially move, translate) between the interior spline of the exterior hub 11 and the exterior spline of the interior hub 10.

When the locking device is in the locked position, the stoppers 17 disposed at the side of the interior hub 10 protrude outward from the case 14. The outside latch protrusions of the stoppers 17 may be inserted into the inside of the latch grooves disposed in the exterior hub 11. Accordingly, the exterior and interior hubs 11 and 10 may be fixed to prevent movement relative to each other. In other words, the splines of the exterior and interior hubs may be fixed to prevent movement in the locked position of the locking device when the vehicle travels normally, and movement of the splines may be limited to during a collision (e.g., the splines are pressed and assembled in order to reduce a backlash).

Furthermore, when a vehicle collision occurs, the powertrain may be displaced and the spline portion 12 between the yoke shaft and the interior hub 10 may slide beyond a normal range, and the end of the yoke shaft, (e.g., the end of the spline portion 12) contacts the switch 16. Thus, the locked position of the locking device may be disengaged (e.g., unlocked). When the locked position of the locking device is disengaged, the fixed position between the exterior and interior hubs 11 and 10 may be released, and the spline portion between the exterior and interior hubs 11 and 10 may slide due to a collision load, thereby being separated therefrom. The overlap of the exterior and interior hubs may continue to increase, and the interior hub may be inserted into the exterior hub. Accordingly, the resistance due to a substantial collapse load of the conventional propeller shaft is not generated during a collision. Therefore, performance upon impact may be improved by reducing a collapse load and may secure the safety of the passengers when the vehicle collision occurs.

The propeller shaft with a locking device according to the exemplary embodiments of the present invention has the following advantages. First, a collapse load may be reduced since a variation in length of the propeller shaft may be absorbed twice during a collision. In other words, when collapse load is generated due to the frictional force of the spline pressing portion between the exterior hub and the interior hub, the splines thereof may be pressed and assembled to reduce a backlash. Since the collapse load is not additionally generated by the locking device, the limited swaging structure in the related art may be improved.

Secondly, the exemplary embodiments have a structure where the basic functions of the propeller shaft may be performed equally before the switch of the locking device contacts the spline portion. Further, the switch contacts the spline portion to be operated when abnormal conditions such as collision occur. Therefore, quality deviation may be prevented and high quality may be realized. When the existing swaging structure is deformed, the circlip is separated, or the pin is collapsed, a collapse load may significantly deviated based on collision conditions. The present invention additionally includes the locking device that may be used without significant adjustments to the existing systems. When the vehicle collision occurs, performance upon impact is decreased since a substantial collapse load of the propeller shaft acts as resistance. However, by the application of the present invention, the performance upon impact during a collision may be improved by reducing the resistance, and thus increasing the safety of the passengers.

The invention has been described in detail with reference to exemplary embodiments thereof. However, it will be appreciated by those skilled in the art that changes may be made in these exemplary embodiments without departing from the principles and spirit of the invention, the scope of which is defined in the appended claims and their equivalents.

What is claimed is:

1. A propeller shaft with a locking device, comprising:
a locking device disposed in a portion in which an interior hub overlaps with an exterior hub in the propeller shaft, and installed to be latched to both the hubs for locking the interior hub to the exterior hub,
wherein the locking device is configured such that when the locking device contacts a spline portion slidably and directly coupled to the interior hub, the locking device is unlatched from the exterior hub and the interior hub and the exterior hub are unlocked, enabling the hubs to slide relative to each other, and thus the spline portion slides due to a collision load, thereby being separated therefrom.

2. The propeller shaft of claim 1, wherein the locking device includes
a hollow case;
a switch coupled inside the hollow case to be axially movable while being elastically supported by a spring, the switch in contact with the spline portion,
a plurality of stoppers disposed on a circumference of the hollow case and in contact with and supported by an exterior peripheral surface of the switch, wherein each of the stoppers is latched to both interior peripheral surfaces of the interior and exterior hubs and is radially translatable, and
ring springs support the stoppers while surrounding circumferences thereof.

3. The propeller shaft of claim 2, wherein the stoppers of the locking device include a plurality of latch protrusions disposed on an exterior surface of each stopper are respectively fitted into latch grooves disposed on the interior peripheral surfaces of the interior and exterior hubs, to restrict the hubs from sliding relative to each other.

4. The propeller shaft of claim 2, wherein the stoppers of the locking device include support protrusions disposed on interior peripheral surfaces and are supported by the exterior peripheral surface of the switch, and are restricted from radial translation.

5. The propeller shaft of claim 2, wherein the stoppers of the locking device contact the spline portion and the switch to have support protrusions of the stoppers received within a protrusion insertion groove disposed in the exterior peripheral surface of the switch by an elastic force of the ring springs when the switch translates, and the latching of the interior hub to the exterior hub is in an unlatched position.

6. The propeller shaft of claim 1, wherein the locking device includes:
a hollow case fastened inside the interior hub;
a switch coupled inside the locking device to be axially movable while being elastically supported by a spring, the switch in contact with the spline portion,
a plurality of stoppers disposed on a circumference of the case and in contact with and supported by an exterior peripheral surface of the switch, the stoppers being latched to an interior peripheral surface of the exterior hub and being radially translatable; and
ring springs surround the circumference and support the stoppers.

7. A propeller shaft with a locking device, comprising:
a locking device disposed in a portion in which an interior hub overlaps with an exterior hub in the propeller shaft, and installed to be latched to both the hubs for locking the interior hub to the exterior hub; and
a spline portion slidably and directly coupled to the interior hub,
wherein the locking device is configured such that when the spline portion slides beyond a normal range in the interior hub and contacts the locking device, the locking device is unlatched from the exterior hub and the interior hub and the exterior hub are unlocked, enabling the hubs to slide relative to each other, and thus the spline portion slides due to a collision load, thereby being separated therefrom.

* * * * *